(12) United States Patent
Shor et al.

(10) Patent No.: US 9,461,869 B2
(45) Date of Patent: Oct. 4, 2016

(54) SYSTEM AND METHOD FOR PROCESSING DATA FLOWS

(71) Applicant: FREESCALE SEMICONDUCTOR, INC., Austin, TX (US)

(72) Inventors: Roy Shor, Tel Aviv (IL); Ori Goren, Kibutz Ruchama (IL); Avraham Horn, Givath Shmuel (IL)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 131 days.

(21) Appl. No.: 14/149,215

(22) Filed: Jan. 7, 2014

(65) Prior Publication Data
US 2015/0195740 A1    Jul. 9, 2015

(51) Int. Cl.
| | | |
|---|---|---|
| G06F 13/28 | (2006.01) | |
| H04L 29/08 | (2006.01) | |
| H04L 27/34 | (2006.01) | |
| H04L 25/02 | (2006.01) | |
| H04L 27/32 | (2006.01) | |
| H04L 25/05 | (2006.01) | |
| H04L 27/12 | (2006.01) | |
| H04W 88/08 | (2009.01) | |
| H04W 24/02 | (2009.01) | |
| H04W 28/06 | (2009.01) | |
| H04B 1/00 | (2006.01) | |

(52) U.S. Cl.
CPC ......... *H04L 29/08027* (2013.01); *G06F 13/28* (2013.01); *H04L 25/05* (2013.01); *H04L 27/34* (2013.01)

(58) Field of Classification Search
CPC .............. H04W 28/065; H04W 88/08; H04L 29/08027; G06F 13/28

USPC ......................................................... 370/328
See application file for complete search history.

(56) References Cited

U.S. PATENT DOCUMENTS

| | | |
|---|---|---|
| 5,965,819 A | 10/1999 | Piety et al. |
| 7,460,513 B2 * | 12/2008 | Osterling ....................... 370/342 |
| 2005/0105534 A1 | 5/2005 | Osterling |
| 2007/0253465 A1 | 11/2007 | Muharemovic et al. |
| 2009/0245422 A1 | 10/2009 | Sampath et al. |
| 2010/0182899 A1 | 7/2010 | Leviant et al. |
| 2011/0255497 A1 * | 10/2011 | Pan et al. ....................... 370/329 |
| 2014/0023048 A1 * | 1/2014 | Vu et al. ........................ 370/336 |
| 2015/0180626 A1 * | 6/2015 | Hao et al. ...................... 370/329 |

OTHER PUBLICATIONS

Notice of Allowance mailed Mar. 30, 2015 for U.S. Appl. No. 14/091,430, 20 pages.
U.S. Appl. No. 14/091,430, Shor, R. et al., "Method and System for Processing Data Flows", filed Nov. 27, 2013.
Freescale Semiconductor, Inc., "MSC8157 Reference Manual: Broadband Wireless Access Six Core DSP," Rev. 2, Jan. 2012, 42 pages.
Texas Instruments, "Data Manual: TMS320C6670 Multicore Fixed and Floating-Point System-on-Chip", Literature No. SPRS689D; Mar. 2012; 226 pages.

* cited by examiner

*Primary Examiner* — Un C Cho
*Assistant Examiner* — Peian Lou

(57) ABSTRACT

A digital signal processor (300), compatible with the Common Public Radio Interface (CPRI), permits reading and writing of IQ data of antenna carriers which have two different sampling rates by using just two single sample rate DMA (Direct Memory Access) modules (306,313). The digital signal processor (300) is capable of processing data of different sampling rates on just one CPRI lane comprising one framer (302). This is achieved by incorporating a divider module (307) and a multiplexer module (314) between the framer (302) and system memory (309, 315). The processor (300) may also be configured so that single sampling rates can also be accommodated.

16 Claims, 6 Drawing Sheets

FIG. 1 – Prior Art

SYSTEM AND METHOD FOR PROCESSING DATA FLOWS

FIELD OF THE INVENTION

This invention relates to a system and method for processing data flows and particularly, though not exclusively, to such a system and method for processing flow of data in cellular communications networks.

BACKGROUND OF THE INVENTION

In a typical cellular communications system, wireless user equipment units (UEs), for example, mobile phones, communicate via a radio access network to one or more core networks. A radio access network covers a geographical area which is divided into cells, with each cell area being served by a radio base station. Several base stations are connected, typically via land lines, to a control node known as a radio network controller (RNC). Such a control node supervises and coordinates various activities of the several radio base stations which are connected to it. The radio network controllers are typically connected to one or more core networks. One example of a radio access network is the Universal Mobile Telecommunications (UMTS) Terrestrial Radio Access Network (UTRAN). The UMTS is a third generation (3G) system and UTRAN is essentially a radio access network providing wideband code division multiple access (WCDMA) to user equipment units. Fourth generation systems are evolving towards a broadband and mobile system. The 3rd Generation Partnership Project has proposed a Long Term Evolution (LTE) solution, namely, an Evolved Universal Mobile Telecommunication System Territorial Radio Access Network, (E-UTRAN), for a mobile access network.

In many radio access networks the radio base station is a concentrated node with most of its components being located at a concentrated site. However, a radio base station can also be configured with a more distributed architecture. For example, a distributed radio base station can take the form of one or more radio equipment (RE) portions that are linked to a radio equipment control (REC) portion over an internal interface. One example of an internal interface of a radio base station which links a radio equipment portion of the radio base station to a radio equipment control portion of the base station is the Common Public Radio Interface (CPRI). The Common Public Radio Interface (CPRI) is described in Common Public Radio Interface (CPRI) Interface Specification Version 4.1 (18 Feb. 2009) and also Version 4.2 (2010) and Version 5 (2011).

The Common Public Radio Interface (CPRI) is an industry cooperation aimed at defining a publicly available specification for the key internal interface of radio base stations between radio equipment control (REC) and radio equipment (RE), thereby allowing base station manufacturers to share a common protocol and more easily adapt platforms from one customer to another. In essence, a radio base station is decomposed into two separate blocks, known as REC and RE. The REC provides access to a UMTS network, for example, via the Iub interface, whereas the RE serves as the air interface to user equipment, known as Uu in a UMTS network. The REC generally comprises the radio functions of the digital baseband domain, whereas the RE contains analogue radio frequency functions. The functional split between the REC and RE is done in such a way that a generic interface, CPRI, based on In-Phase and Quadrature (IQ) data can be defined. Several IQ data flows can be sent over one physical link with each data flow reflecting the data of one antenna for one carrier, the so-called antenna carrier "AxC." Several AxC's having the same sampling rate may be aggregated into an "AxC Group." IQ data of different antennas along with control data are multiplexed onto a transmission line. The CPRI has a basic frame structure for carrying a control word and an IQ data block.

The functional split between the REC and RE allows the RE to be positioned close to an associated antenna. This reduces the distance which the associated signals have to travel before they are received by the RE, thereby negating the need for tower-mounted amplifiers and antenna system controllers. The link between the RE and REC is generally optical, allowing the link length to be much greater when compared with wired coaxial systems. Therefore, the distance between the RE and RRC can be around 10 Km, thereby increasing the flexibility of deployment of RE's within the network when utilising CPRI. One REC may be linked to two or more RE's or one RE may be linked to multiple REC's in a chain topology with each REC being configured to forward data to other REC's in the chain.

Many of the functions which an REC has to perform, which include channel coding/encoding, spreading/despreading, frame and time slot generation, for example, may be realised by a proprietary digital signal processing device. Two examples of such DSP devices which support the CPRI are the Freescale B4860 and the Freescale MSC 8157 Broadband Wireless, Access Six Core DSP which is described in Freescale Semiconductor Data Sheet MSC8157E, November/2011. This Digital Signal Processor includes (inter alia) a CPRI unit which includes a "framer" module which handles the transmission and reception of all IQ data, and a DMA (direct memory access) module associated with the framer which transfers the receive and transmit IQ data to and from antenna carrier buffers in a memory.

Usually, the sampling rates of all AxC's in a CPRI unit are the same. A single CPRI unit will normally support only one AxC sample rate. If different sampling rates need to be supported, however, additional circuitry is required. One known way of supporting two sampling rates in the MSC8157 device employs three CPRI units. FIG. 1 shows an example of this known solution. In the receive direction, a first framer 101 receives RF data (from an RE 102 for example) and its associated DMA module 103 transfers data with a first sampling rate to system memory 104. A second framer 105 receives the RF data from the first framer 101 via auxiliary interface modules 106, 107 and outputs it directly via Serialiser/Deserialiser links 108, 109 to a third framer 110. A DMA module 111 associated with the third framer 110 transfers data with a second sampling rate to system memory 112. In the transmit direction, the DMA module 103 associated with the first framer 101 fetches data with the first sampling rate from system memory 104 and transfers it to the first framer 101 for outputting towards the RE 102. The third framer's DMA module 111 fetches data with the second sampling rate from system memory 112 and the third framer 110 transfers the data to the second framer 105 via the serialiser/deserialiser 108, 109 interface. Then, the second framer 105 transfers the data with the second sampling rate via the auxiliary interfaces 107, 106 to the first framer 101 which, in turn, outputs the data towards the RE 102. Each CPRI unit contains receive and transmit configuration tables that determine which AxC's in a frame to transfer to or fetch from system memory and their location in the frame. Further, each CPRI unit contains receive mask registers (not shown) with the masking of bits of the auxiliary interface 106, 107. For example, if a masking bit is "set" then data coming from framer2 105 is sent to the RE 102. Conversely, if the masking bit is "cleared" then the data read by framer1 101 from system memory 104 is sent to the RE 102. This solution has the disadvantage of requiring an extra CPRI unit and interconnections.

SUMMARY OF THE INVENTION

The present invention provides a system and method for processing data flows as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Figure 1:
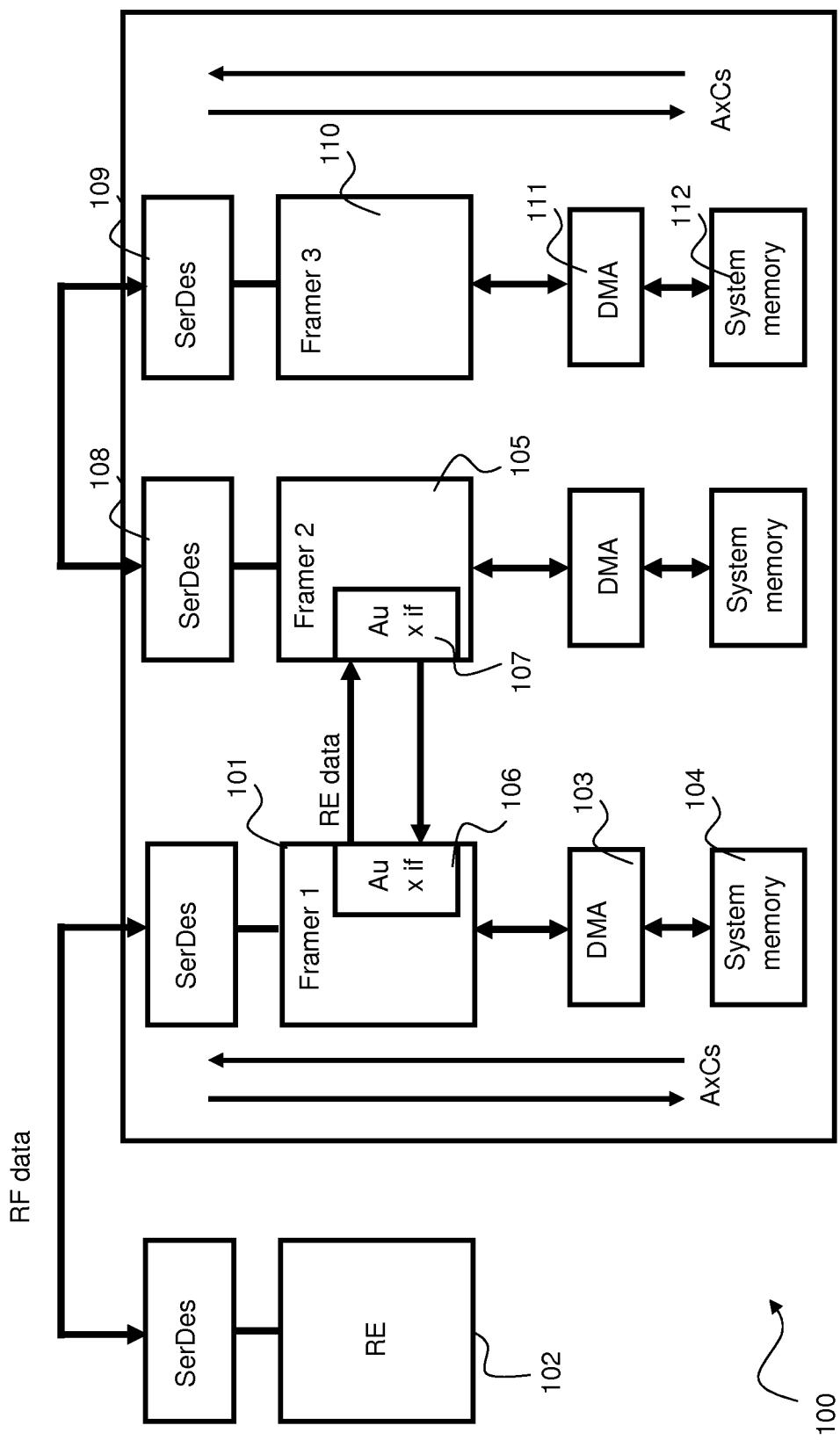
FIG. 1 is a simplified block diagram of an example of a known system for processing data flows.
Figure 2:
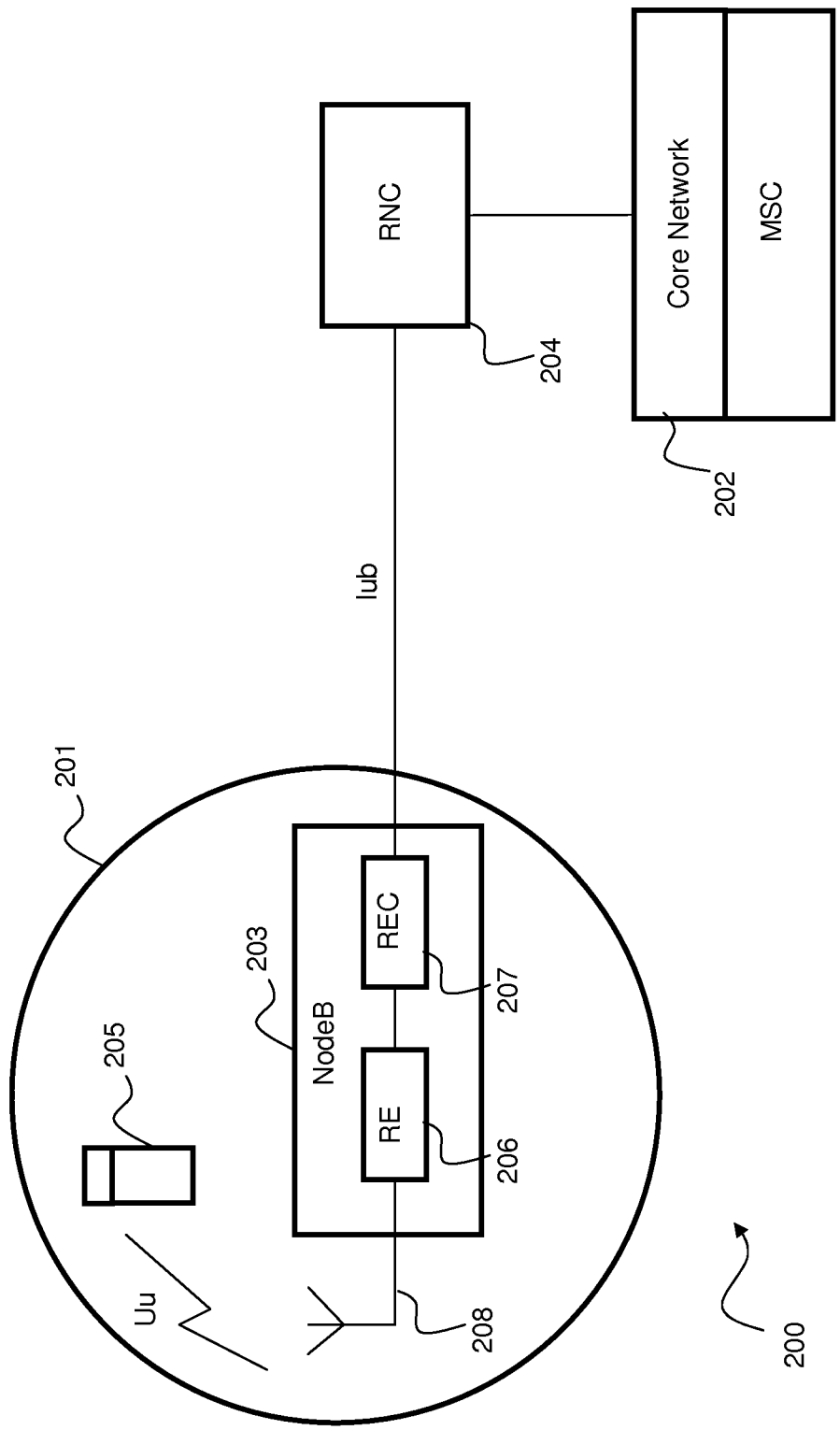
FIG. 2 is a simplified schematic diagram of a wireless communication system including an example of a system for processing data flows.

Referring now to FIG. 2, an example of part of a wireless communication system operating in accordance with embodiments of the invention is illustrated and indicated generally at 200 and comprises a 3G macro cell whose coverage area is indicated at 201.

A core network 202 of the wireless communication system of FIG. 2, which includes a Mobile Switching Centre (MSC) and other network elements (not shown), may serve to interface the wireless communication system 200 with a packet data network, for example a Public Switched Data Network (PSDN), (such as the internet) or a Public Switched Telephone Network (PSTN).

The 3G macro-cell 201 may be served by a radio base station (or "Node B") 203 which may be controlled by a Radio Network Controller (RNC) 204. The RNC 204 may be linked to the core network 202.

Typically, the node B 203 may be arranged to receive signals coming from a mobile device 205 located in the macrocell 101 and down-convert them to digital data. Encoded signals are then brought back to baseband before being transmitted to the terrestrial network (that is the core network 202). Similarly, the node B 203 may be arranged to receive signals from the core network 202 and convert these for transmission over a wireless interface to a mobile unit 205 in the macrocell 201.

In this example, the node B 203 is a distributed radio base station and comprises a radio equipment portion (RE) 206 and a radio equipment control portion (REC) 207. The REC 207 may be linked to the RNC 204 over the so-called "Iub" interface. The RE 206 may be coupled to an antenna 208 which may communicate wirelessly with a mobile unit 205 located within the macrocell's area of coverage 201 over the so-called "Uu" interface.

In such a distributed node B, information transfer between the radio equipment control (REC) portion 207 and the radio equipment (RE) portion 206 may occur by use of a parallel control word transmitted over an internal interface, for example the co-called Common Public Radio Interface CPRI). Data communication by the REC 207 with the core network side of the node B 203, as well as data communication by RE 206 with the antenna side of the node B 203, occurs by serial communication.

The REC 207 and RE 206 may be physically separated. For example, the RE 206 may be close to the antenna 208 and the REC 207 may be located in a conveniently accessible site. Alternatively, both REC 207 and RE 206 may be co-located.

In this example, the REC 207 may provide access to the core network 203 via the Iub interface and so may be primarily concerned with Iub transport and Iub protocols, control and management of the node B and digital baseband processing. For the downlink (that is the REC 207 to RE 206), the REC 207 may be arranged to handle such operations as channel coding, interleaving, spreading, scrambling, adding of physical channels, controlling transmit power of each physical channel, frame and slot signal generation (including clock stabilization). For the uplink (that is from RE 206 to REC 207), the REC 207 handles such operations as channel de-coding, de-interleaving, de-spreading, de-scrambling, signal distribution to signal processing units, detection of feedback information for transmit power control, and signal to interference ratio measurement.

The radio equipment RE 206 may be arranged to serve the air interface Uu to the mobile unit 205 by providing the analogue and radio frequency functions such as filtering, modulation, frequency conversion and amplification. For the downlink, RE 206 may perform operations such as digital to analogue conversion, up conversion, on/off control of each carrier, carrier multiplexing, power amplification and limiting, antenna supervision, and RF filtering. For the uplink, the RE may perform operations such as analogue to digital conversion, down conversion, automatic gain control, carrier de-multiplexing, low noise amplification, and RF filtering. Thus, the REC 207 comprises the radio functions of the digital baseband domain, whereas the RE 206 comprises the analogue radio frequency functions. The functional split between both parts is done in such a way that a generic interface based on In-Phase and Quadrature (IQ) data can be defined.

The Common Public Radio Interface (CPRI) Interface Specification (See Version 4.1 for example) defines protocols for a physical layer (layer 1) and a data link layer (layer 2). Layer 1 defines, e.g., electrical characteristics, optical characteristics, time division multiplexing of the different data flows, and low level signaling. Layer 2 defines the media access control, flow control and data protection of the control and management information flow. Information flow over the parallel communications links 26 of node B 203 is carried in frames. In the example implementation which is compatible with Common Public Radio Interface Specification Version Referring now to FIG. 3 a system for processing data flows may comprise a data flow processing module 300 arranged for receiving, transmitting, processing, storing and retrieving communications data.

Figure 3:
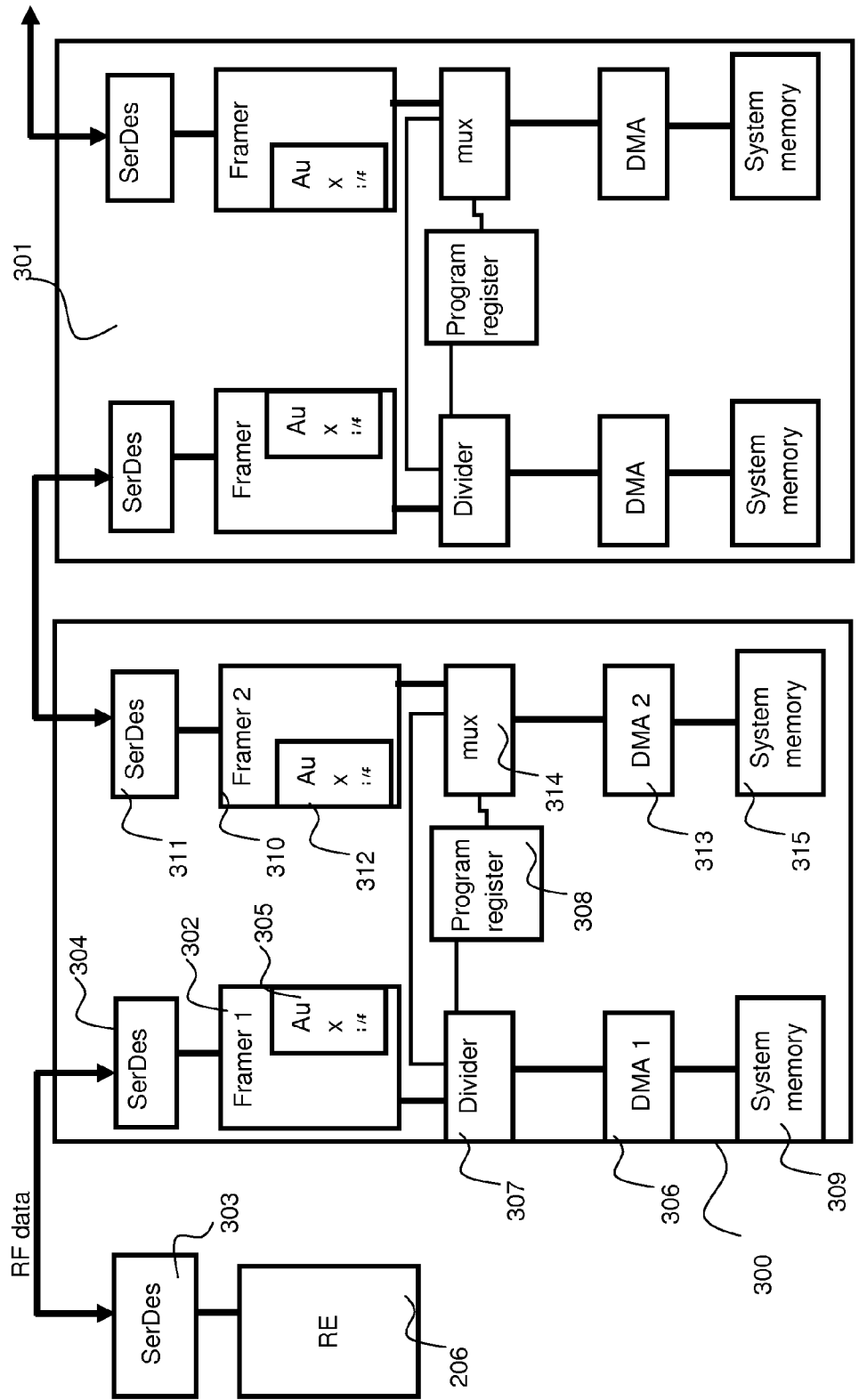
FIG. 3 is a simplified block diagram of an example of a system for processing data flows.

In this example, communications data may be received from and transmitted to the RE 206 of FIG. 2 and the module 300 may be incorporated in the REC 207 of FIG. 2. The module 300 may be "daisy-chained" with one or more like modules of FIG. 2. (One further module 301 is shown in FIG. 3 as an example).

The data flow processing module 300 may include a first framer (framer1) 302 which may be operably coupled to the RE 206 though serialiser/desreialiser interfaces. 303 and 304 included in the RE 206 and first framer 302 respectively. The first framer may also include an auxiliary interface 305. The module 300 may also include a first Direct Memory Access module (DMA1) 306 and a divider module 307. The divider module 307 may be operably coupled between the first framer 302 and, the first Direct Memory Access module (DMA 1) 306. The module 300 may further include a programming register 308 which may be operably coupled to the divider module 307. The DMA1 306 may also be operably coupled to a system memory module 309. The system memory module 309 may be included in the data flow processing module 300 or, in an alternative embodiment, may be external to the module 300.

The framer 1 and the DMA1 and the divider module 306 may comprise a "CPRI lane." A CPRI lane handles the reception and transmission of CPRI data included in the communications traffic (comprising IQ samples and control and management signals) which is received from and transmitted to the RE 207.

The data flow processing module 300 may also include a second framer (framer2) 310 which may be operably coupled to a first framer in the daisy-chained module 301 through a serialiser/desreialiser interface 311 included in the second framer 310. The second framer 310 may also include an auxiliary interface 312 which may be operably coupled to the auxiliary interface 305 of the first framer 302. The module 300 may also include a second Direct Memory Access module (DMA2) 313 and a multiplexer module 314. The multiplexer module 314 may be operably coupled between the second framer 310 and, the second Direct Memory Access module (DMA 2) 313. The programming register 308 may be operably coupled to the multiplexer module 314. The DMA2 313 may also be operably coupled to a further system memory module 315. This further system memory module 315 may also be included in the data flow processing module 300 or, in an alternative embodiment, may be external to the module 300. The framer2 310 and the DMA2 313 and the multiplexer module 314 may comprise a second CPRI lane. The divider module 307 of the first CPRI lane may be operably coupled to the multiplexer module 314 of the second CPRI lane.

In one example embodiment, in a receive mode (uplink) of operation a dataflow having a frame structure may be sent from the RE 206 to the first framer1 302 via the serialiser/ deserialiser interfaces 303 and 304 respectively. The data flow in this example may comprise IQ data of one or more antenna carriers (AxC). The frame structure of the data flow may, for example, be configured in accordance with the CPRI Specification V4.1. The antenna carriers may have the same sampling rate (AxC1) or have one of two sampling rates, AxC1 or AxC2. The framer1 302 may transfer the entire received data flow to the second framer2 310 via their respective auxiliary interfaces 305, 312. The framer2 310 may further transfer the entire received dataflow to a first framer of the module 301 if a daisy-chained topology is desired.

In a transmit mode (downlink), a similar data flow having a frame structure may be sent from the first framer1 302 of the module 300 to the RE 206 via their respective serialiser/ deserialiser interfaces 304, 303. The dataflow may similarly comprise IQ data of one or more antenna carriers of the same sampling rate or of one of two sampling rates. The framer1 302 may also transmit to the RE 303, IQ data which it receives from the associated dataflow processing module 301 in the daisy-chained configuration via the framer2 310.

In general, a framer such as either of the framers 302, 310 of the dataflow processing module 300 of FIG. 3, may comprise two parts; namely, a receive part and a transmit part. The receive part acts to extract IQ data from the received frames (from the RE 206) which are subsequently written into system memory by way of direct memory access (DMA). The transmit part constructs the appropriate CPRI frame structure. IQ data read via DMA from system memory along with control data are multiplexer together by this transmit part for transmission to the RE 206.

Thus, each DMA module 306, 313 of FIG. 3 may temporarily store received IQ data before transferring the data either to system memory (in a receive mode) or to a framer (in a transmit mode). Each DMA module 306, 313 may, likewise, contain a receive part and a transmit part. The receive part may be arranged to transfer the IQ data received by its associated framer from the framer to system memory via a write bus. A transmit part may be arranged to transfer IQ data from system memory to its associated framer via a read bus In a first exemplary mode of operation the data flow may comprise IQ data of antenna carriers all having the same sampling rate AxC1. The program register 308 may set an output, which is coupled to both the divider 307 and the multiplexer 314, which serves to put both the divider 307 and the multiplexer 314 in a bypass mode. In this first exemplary mode, each CPRI lane may be independent, in which case, the framer1 302 is connected through the divider 307 to the first DMA1 306 and the framer2 310 is connected through the multiplexer to the second DMA2 313. In the receive path the divider 307 acts to directly transfer the entire data received by framer1 302 to DMA1 306. and the multiplexer 314 acts to directly transfer the entire data received by framer2 to DMA2 313. The data received by either framer 302,310 may originate from the RE 206 or from another REC. Each DMA module 306,313 may write the data to its respective system memory. 309,315. In the transmit path, the divider 307 acts to directly transfer data which DMA1 306 may read from system memory 309 to the first framer1 302. Also, the multiplexer 314 acts to directly transfer data which DMA2 313 may read from system memory 315 to the second framer2 310. Each framer 304, 310 may transmit the data to the RE 206 or another REC.

In a second exemplary mode of operation, the data flow may comprise IQ data of antenna carriers all having the same sampling rate AxC1 and the divider 307 and the multiplexer 314 may again be set in a bypass mode by the program register 308. Also in this mode, the first and second framers 302, 310 may be connected together through their auxiliary interfaces 305, 312. The first framer1 302 may be connected through the divider 307 to the first DMA1 306. The second framer2 310 may be active but the second DMA2 313 unit is not used. In the receive path the data coming from the RE 206 or another REC may be received by the first framer1 302 and part of the data (one or some of the AxCs) may be transferred by the divider 307 to the first DMA1 306. This DMA module 306 may write the received data to the system memory 309. Additionally, all the received data may be passed by the first framer1 302 to the second framer2 310 via their respective auxiliary interfaces 305, 312. The second framer2 310 may transmit this data to another device. In the transmit path the first DMA1 306 may read data from the system memory 309 which the divider 307 sends directly to the first framer1 302. The first framer1 302 may then aggregate and transmit this data with data coming from another device received by the second framer2 310 and passed to the first framer1 302 through the auxiliary interfaces 305, 312.

In a third exemplary mode of operation, the data flow may comprise IQ data of antenna carriers having two different sampling rates AxC1, AxC2. The program register 308 may set an output, which is coupled to both the divider 307 and the multiplexer 314, which serves to switch both the divider 307 and the multiplexer 314 out of a bypass mode and into a dual sampling rate mode. The first and second framers 302, 310 may be operably coupled via their respective auxiliary interfaces 305, 312. The first framer1 302 may be selectively coupled to either the first DMA1 306 or to the second DMA2 313 depending on the settings of the divider 307 and multiplexer 314 and under the control of the program register 308. Both the second framer2 310 and the second DMA2 313 may be active in this third example of operation but they do not need to be operably coupled to one another.

In the receive path the data coming from the RE 206 or another REC is received by the first framer1 302 and the data of AxC's having a first sample rate AxC1 may be switched by the divider through to the first DMA1 306 which may write the data to the system memory 309. The data of AxC(s) having a different sampling rate AxC2 may be diverted by the divider 307 to the second DMA2 313 through the multiplexer 314. The DMA2 313 then may write the data to the second system memory 315. All the received data may be passed by the first framer1 302 to the second framer2 310 through their respective auxiliary interfaces 305, 312. The second framer2 310 may then transmit this data to another device, for example, another data flow processing module such as module 301 of FIG. 3.

In the transmit path the first DMA1 306 may read data of AxC(s) of a first sampling rate AxC1 from the first system memory 309 and the divider 307 may be arranged to transfer it to the first framer1 302. The second DMA2 313 may read data of a different sampling rate AxC2 from the second system memory 315. The multiplexer 314 may then transfer this data to the divider which, in turn transfers it to the first framer1 302. The first framer1 302 may then aggregate and transmit the data of both sampling rates AxC1, AxC2 along with data coming from another device (according to its mask) which is received by the second framer2 310 and passed to the first framer1 302 via the auxiliary interfaces 305,312. In this third example of operation, the divider 307 is responsible for separating data flows of different sampling rates and for sending or retrieving them to or from either the first or the second of the DMA modules 306, 313. The Multiplexer 314 enables connection of the second DMA2 313 to the first framer1 302 (via the divider 307). In a bypass mode the multiplexer 313 may transfer data from the second DMA2 313 to the second framer2 310 and vice versa.

Figure 4:
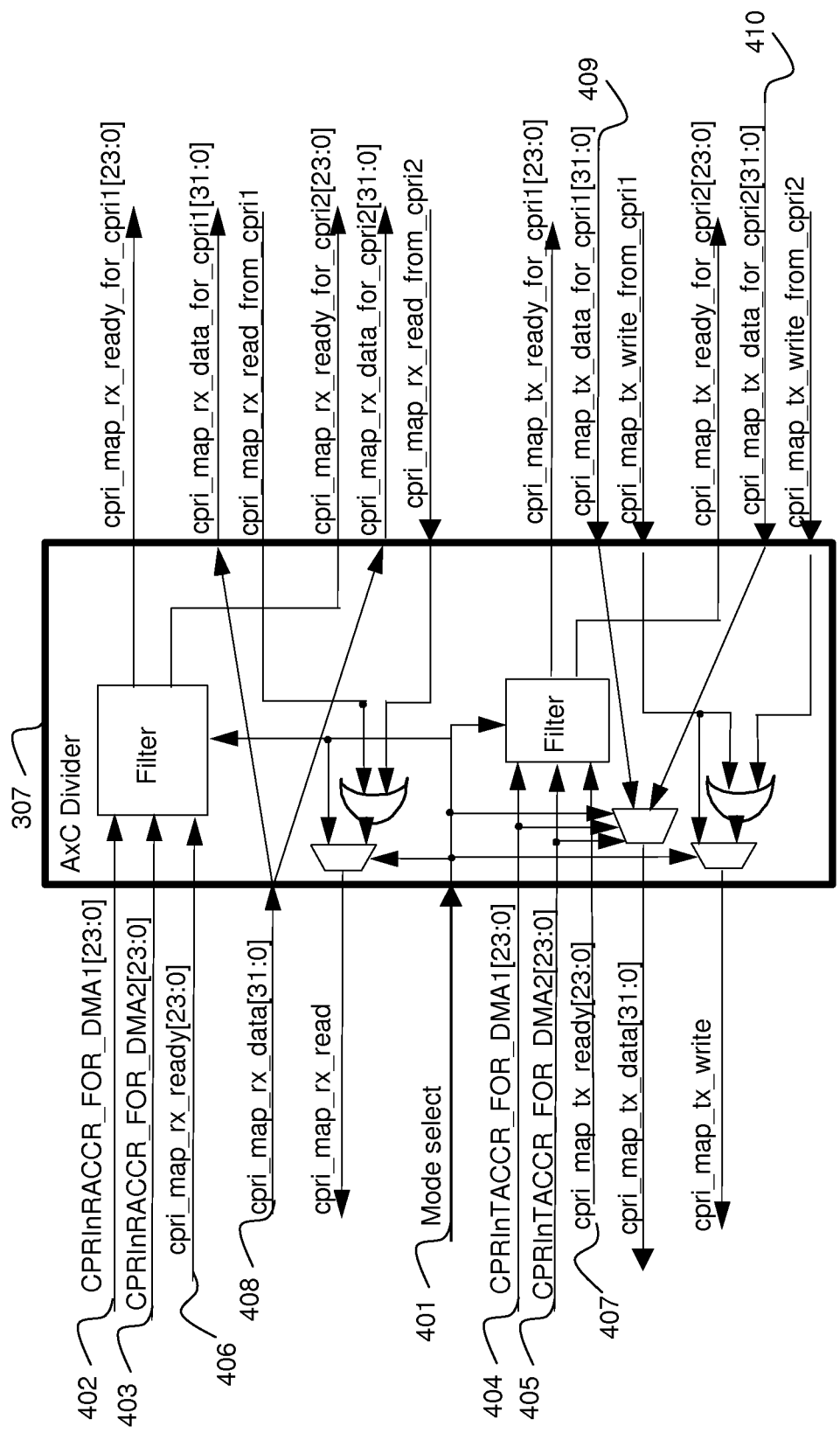
FIG. 4 is a simplified block diagram of an example of a divider module.

Reference will now be made to FIG. 4 which is a simplified block diagram showing examples of logical elements which may comprise the divider 307 of FIG. 3. A "mode select" signal on line 401 from the program register 308 may set the divider 307 in either a bypass mode, for cases where all IQ data has the same sampling rate, or a dual sampling rate mode, for cases where two sampling rates are present. Further control signals from the program register 308 on lines 402-405 and the framer1 307 on lines 406 and 407 may enable the divider to select between DMA1 and DMA2 (via the multiplexer 314) as alternative destinations for data received by the framer1 302 on line 408 and to forward data retrieved from either DMA1 306 on line 409 or DMA2 315 (via the multiplexer 314) on line 410 to the framer1 302.

Figure 5:
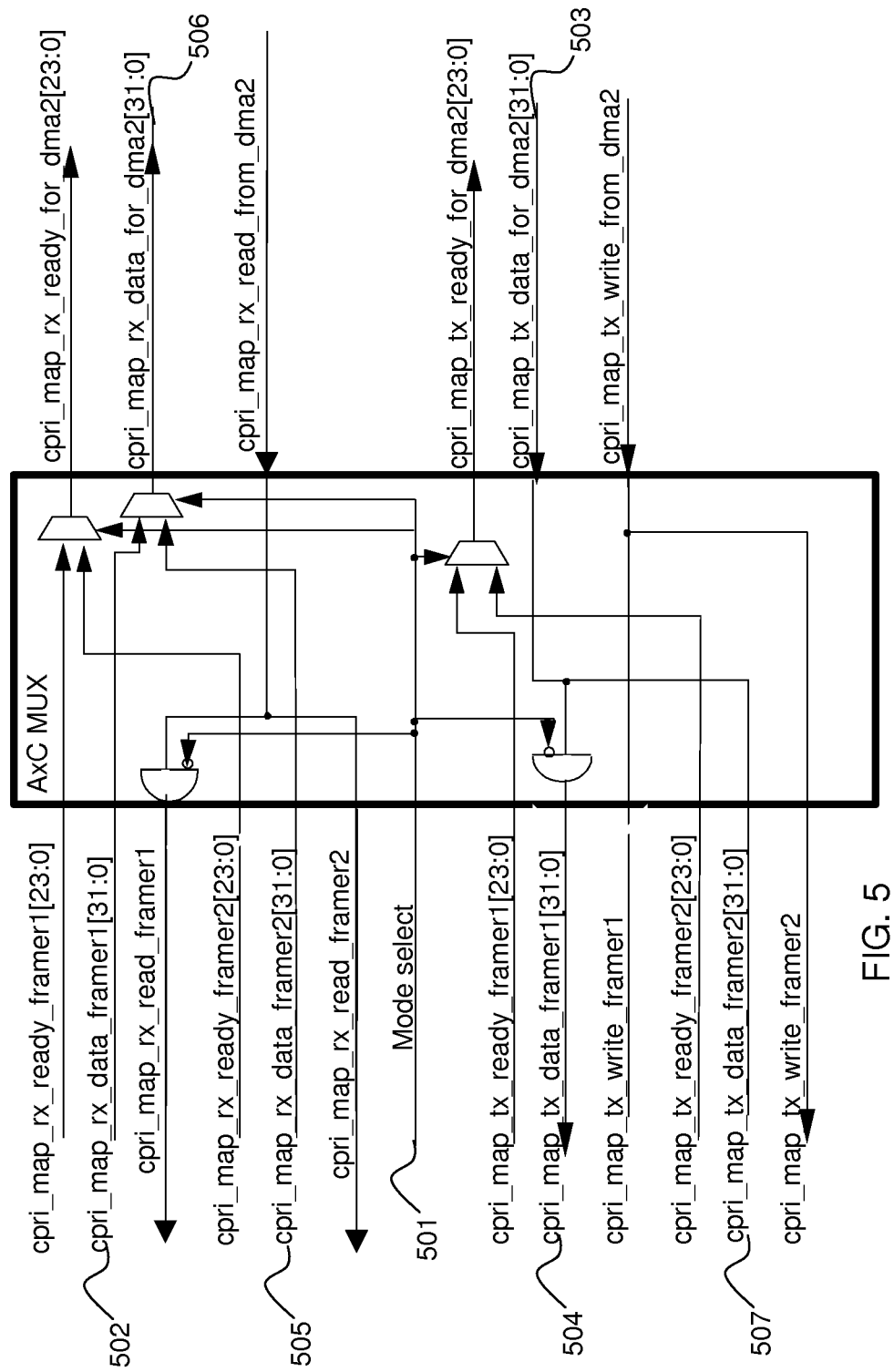
FIG. 5 is a simplified block diagram of an example of a multiplexer module.

Reference will now be made to FIG. 5 which is a simplified block diagram showing examples of logical elements which may comprise the multiplexer 314 of FIG. 3. A "mode select" signal on line 501 from the program register 308 may set the multiplexer 314 in either a bypass mode, for cases where all IQ data has the same sampling rate, or a dual sampling rate mode, for cases where two sampling rates are present. In dual sampling rate mode, data received by the framer 1 302 and destined for the DMA2 315 may be input on line 502 from the divider 307. Data retrieved by the DMA2 313 on line 503 may be directed to the framer1 302 on line 504 (via the divider). In bypass mode, the multiplexer may transfer data between the second framer2 310 and the DMA2 313 via lines 505 and 506 for receive data and via lines 503 and 507 for transmit data.

In an alternative exemplary embodiment, the divider module 307 and the multiplexer module 314 may be combined into a single module and one such single module may be incorporated in each CPRI lane of FIG. 3. In this alternative example, in the dual sampling rate mode, the multiplexer of the single module included in the first lane and the divider of the single module included in the second lane will both be redundant and can be operated in bypass mode.

Figure 6:
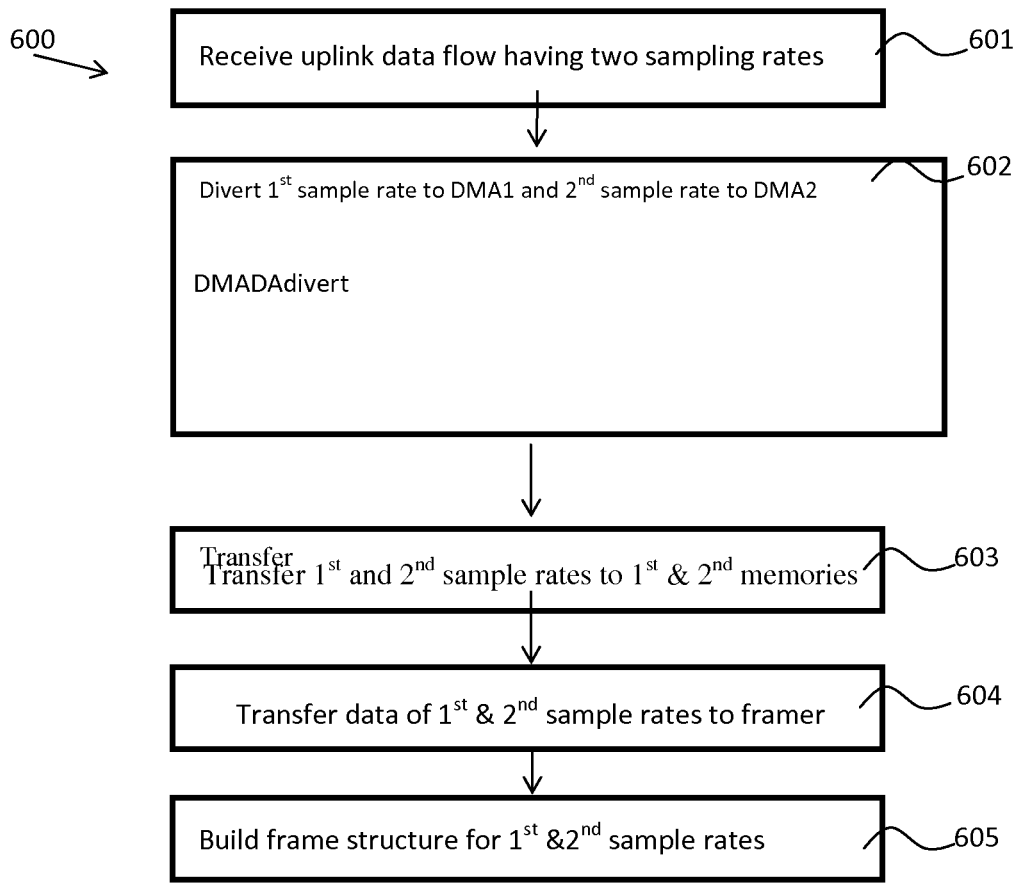
FIG. 6 is a simplified flowchart illustrating an exemplary method of processing data flows.

An example of a method for processing data flows will now be described with reference to FIG. 6 which is a simplified flowchart illustrating an exemplary method 600 of processing data flows. In an uplink direction, at 601. a data flow which has a frame structure and includes IQ data of a first antenna carrier having a first sampling rate and IQ data of a second antenna carrier having a second sampling rate may be received at a framer, from a RE, for example. At 602, IQ data having only the first sampling rate may be diverted to a first Direct Memory Access module and IQ data having only the second sampling rate may be diverted to a second Direct Memory Access module. At 603, the data having only the first sampling rate may be transferred into a first memory and the data having only the second sampling rate may be transferred to a second memory. In a downlink direction, at 604, IQ data of a first antenna carrier having a first sampling rate may be transferred from a first Direct Memory Access module to the framer and IQ data of a second antenna carrier having a second sampling rate may be transferred from a second Direct Memory Access module to the framer. At 605 a frame structure including the first transmit data and the second transmit data is built by the framer for onward transmission, for example, to a RE.

The invention may also be implemented in a computer program product for running on a computer system, at least including code portions for performing steps of a method according to the invention when run on a programmable apparatus, such as a computer system or enabling a programmable apparatus to perform functions of a device or system according to the invention. As an example, a tangible computer program product may be provided having executable code stored therein to perform a method for processing data flows, the method comprising; receiving, at a first framer, a receive data flow which has a frame structure and includes IQ data of a first antenna carrier having a first sampling rate and IQ data of a second antenna carrier having a second sampling rate, diverting IQ data having only the first sampling rate to a first Direct Memory Access module, diverting IQ data having only the second sampling rate to a second Direct Memory Access module, transferring first transmit IQ data of a first antenna carrier having a first sampling rate from a first Direct Memory Access module to a first framer, transferring second transmit IQ data of a second antenna carrier having a second sampling rate from a second Direct Memory Access module 313 to the first framer and building a frame structure including the first transmit IQ data and the second transmit IQ data for onward transmission.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on tangible computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims. For example, the invention may be extended to process data flows of more than two different sampling rates. This may be achieved by employing additional DMA modules (one per sampling rate) and making the necessary modifications to the divide and multiplexer modules.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connections that transfers multiple signals serially or in a time multiplexed manner. Likewise, single connections carrying multiple signals may be separated out into various different connections carrying subsets of these signals. Therefore, many options exist for transferring signals.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, various alternative logic gate arrangements known to those skilled in the art may be configured in order to perform the same functionality as the divider and multiplexer modules illustrated in the drawings Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiment.

The illustrated examples of the divider 307 and multiplexer 314 may be implemented as any number of separate integrated circuits or separate devices interconnected with each other in a suitable manner. Furthermore the module 300 may be implemented in one or several integrated circuits.

For example, an integrated circuit device may comprise one or more dies in a single package with electronic components provided on the dies that form the modules and which are connectable to other components outside the package through suitable connections, such as pins of the package and bondwires between the pins and the dies Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or an limits any particular claim containing such introduced claim element to inventions containing only one such element, even when the same claim includes the introductory phrases one or more or at least one and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

The invention claimed is:

1. A method of processing data flows comprising:
    receiving at a first framer a receive data flow which includes first receive In-Phase and Quadrature (IQ) data of a first antenna carrier having a first sampling rate and second receive IQ data of a second antenna carrier having a second sampling rate;
    directing, by a program register, a divider to divert the first receive IQ data to a first Direct Memory Access module;
    diverting, by the divider, the first receive IQ data to the first Direct Memory Access module in response to directing the divider to divert the first receive IQ data to the first Direct Memory access module;
    directing, by the program register, the divider to divert the second receive IQ data to a second Direct Memory Access module;
    in response to directing the divider to divert the second receive IQ data to the second Direct Memory access module:
        diverting, by the divider, the second receive IQ data to a multiplexer; and
        providing from the multiplexer the second receive IQ data to the second Direct Memo Access module;
    transferring first transmit IQ data of the first antenna carrier having only the first sampling rate from the first Direct Memory Access module to the first framer;
    transferring second transmit IQ data of the second antenna carrier having only the second sampling rate from the second Direct Memory Access module to the first framer;
    building at the first framer a frame structure including the first transmit IQ data and the second transmit IQ data for onward transmission.

2. The method of claim 1 including:
    transferring the first receive IQ data having only the first sampling rate to a first memory; and
    transferring the second receive IQ data having only the second sampling rate to a second memory.

3. The method of claim 1 including:
    building the frame structure including IQ data received from a second framer.

4. The method of claim 2 including:
    building the frame structure including IQ data received from a second framer.

5. The method of claim 1, wherein in transferring the first transmit IQ data to the first framer, the method further includes:
    providing from the first Direct Memory Access module the first transmit IQ data to the divider, wherein the divider transfers the first transmit IQ data to the first framer.

6. The method of claim 5, wherein the second Direct Memory Access module transfers the second transmit IQ data to the multiplexer.

7. The method of claim 6, wherein in transferring the second transmit IQ data to the first framer, the method further includes:
    providing the second transmit IQ data from the multiplexer to the divider; and
    providing from the divider the second transmit IQ data to the first framer.

8. The method of claim 1, wherein in transferring the first transmit IQ data to the first framer, the method further includes:
    providing from the first Direct Memory Access module the first transmit IQ data to a divider, wherein the divider transfers the first transmit IQ data to the first framer.

9. The method of claim 8, wherein the second Direct Memory Access module transfers the second transmit IQ data to a multiplexer.

10. The method of claim 9, wherein in transferring the second transmit IQ data to the first framer, the method further includes:
providing the second transmit IQ data from the multiplexer to the divider; and
providing from the divider the second transmit IQ data to the first framer.

11. A system for processing data flows comprising:
a first framer that receives a data flow which includes first In-Phase and Quadrature (IQ) data of a first antenna carrier having only a first sampling rate and second IQ data of a second antenna carrier having only a second sampling rate;
a first Direct Memory Access module;
a second Direct Memory Access module;
a multiplexer;
a diverter arrangement, wherein the diverter arrangement diverts the first IQ data to the first Direct Memory Access module, diverts the second IQ data to the multiplexer and provides the second IQ data from the multiplexer to the second Direct Memory Access module, transfers first transmit IQ data of the first antenna carrier having only the first sampling rate from the first Direct Memory Access module to the first framer, and transfers second transmit IQ data of the second antenna carrier having only the second sampling rate from the second Direct Memory Access module to the multiplexer and from the multiplexer to the first framer, and wherein the first framer builds a frame structure including the first transmit IQ data and the second transmit IQ data for onward transmission; and
a program register that directs the divider to divert the first receive IQ data to the first Direct Memory Access module, directs the divider to divert the second receive IQ data to the multiplexer, and directs the multiplexer to divert the second receive IQ data from the multiplexer to the second Direct Memory Access module.

12. The system of claim 11 wherein the first framer builds the frame structure including IQ data received from a second framer.

13. The system of claim 11 wherein the system is implemented in one or more integrated circuit devices.

14. A system for processing data flows comprising;
a first processing lane, wherein the first processing lane comprises a first framer that receives a first receive data flow which includes In-Phase and Quadrature (IQ) data of one or more antenna carriers each having a sampling rate associated therewith, a first diverter module and a first Direct Memory Access module,
a second processing lane wherein the second processing lane comprises a second framer that receives a second receive data flow which includes IQ data of one or more antenna carriers each having a sampling rate associated therewith, a second diverter module and a second Direct Memory Access module;
wherein, in a first, single sampling rate mode of operation, the first diverter module selectively diverts IQ data of the first receive data flow from the first framer to the first Direct Memory Access module and transfers first transmit IQ data from the first Direct Memory Access module to the first framer, and the second diverter module transfers IQ data of the second receive data flow from the second framer to the second Direct Memory Access module and selectively diverts second transmit IQ data from the second Direct Memory Access module to the second framer, and
wherein in a second, dual sampling rate mode of operation, the first diverter selectively diverts IQ data of the first receive data flow having a first sampling rate to the first Direct Memory Access module and selectively diverts IQ data of the first receive data flow having a second sampling rate to the second diverter module and transfers first transmit IQ data of a first antenna carrier having the first sampling rate from the first Direct Memory Access module to the first framer and transfers second transmit IQ data of a second carrier having the second sampling rate from the second diverter module to the first framer, and the second diverter module transfers IQ data of the first receive data flow having the second sampling rate from the first diverter to the second Direct Memory Access module and selectively diverts second transmit IQ data of a second antenna carrier having the second sampling rate from the second Direct Memory Access module to the first diverter module, and the first framer is builds a frame structure including the first transmit IQ data and the second transmit IQ data for onward transmission.

15. The system of claim 14 wherein the second framer receives a receive data flow from the first framer and forwards it to a remote device and receives remote transmit IQ data from a remote device and forwards it to the first framer and wherein the first framer builds a frame structure including the remote transmit IQ data for onward transmission.

16. The system of claim 14 wherein the system is implemented in one or more integrated circuit devices.

* * * * *